US006928458B2

(12) United States Patent
Cedola et al.

(10) Patent No.: US 6,928,458 B2
(45) Date of Patent: Aug. 9, 2005

(54) SYSTEM AND METHOD FOR TRANSLATING SYNCHRONIZATION INFORMATION BETWEEN TWO NETWORKS BASED ON DIFFERENT SYNCHRONIZATION PROTOCOLS

(75) Inventors: Kent D. Cedola, Bellevue, WA (US); Stephen D. Flanagin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 357 days.

(21) Appl. No.: 09/892,677

(22) Filed: Jun. 27, 2001

(65) Prior Publication Data

US 2003/0004955 A1 Jan. 2, 2003

(51) Int. Cl.$^7$ .............................................. G06F 17/00
(52) U.S. Cl. .................... 707/203; 707/204; 707/104.1; 707/102; 707/103 Y; 707/100
(58) Field of Search ................................ 707/203–204, 707/100–104.1, 3–6, 10, 31, 201, 8

(56) References Cited

U.S. PATENT DOCUMENTS

| | | | | |
|---|---|---|---|---|
| 5,745,906 A | * | 4/1998 | Squibb ....................... | 707/203 |
| 5,870,760 A | * | 2/1999 | Demers et al. ............. | 707/201 |
| 5,926,816 A | * | 7/1999 | Bauer et al. .................. | 707/8 |
| 6,125,369 A | | 9/2000 | Wu et al. | |
| 6,125,388 A | * | 9/2000 | Reisman ..................... | 709/218 |
| 6,286,060 B1 | * | 9/2001 | DiGiorgio et al. ............ | 710/31 |
| 6,463,427 B1 | * | 10/2002 | Wu ............................... | 707/3 |

FOREIGN PATENT DOCUMENTS

| | | |
|---|---|---|
| EP | 2 330 224 A | 4/1999 |
| EP | 0 974 895 A2 | 1/2000 |
| WO | WO 99/05620 | 2/1999 |

OTHER PUBLICATIONS

Pieya Liu, Web DAV: A Panacea for Collaborative Authoring, Apr. 1999, Multimedia, IEEE Voumn 6, Issue 2.*
Kumar, R. et al., "Protocol Conversion Using Supervisory Control Techniques;" *Proceedings of the 1996 IEEE International Symposium on Computer–Aided Control System Design* (Sep. 1996), pp. 32–37.
Kumar, R. et al., "A Discrete Event Systems Approach for Protocol Conversion;" *Discrete Event Dynamic Systems: Theory and Applications* 7:3 (Jun. 1997), pp. 295–315.
Heeseon Lim et al., "Interworking of SMS Between GSM Based GMPCS System and IS–41 Based Cellular System Using I–SMC;" *WCNC 1999 Wireless Communication and Networking Conference vol. 3* (Sep. 1999), pp. 1432–1436.

* cited by examiner

*Primary Examiner*—Alford Kindred
*Assistant Examiner*—Sana Al-Hashemi
(74) *Attorney, Agent, or Firm*—Merchant & Gould P.C.

(57) ABSTRACT

A system and method is described for translating events originally identified as "change" events in one replication protocol to "add" events in another replication protocol where appropriate. More particularly, a WebDAV-based system interacts with a non-WebDAV based system. On a first replication transaction between the two systems, a sync state table is created on an intermediate server or a server that facilitates communication between the two systems. The sync state table is linked to the non-WebDAV system for future replication transactions. The sync state table maintains a list of objects that have been sent to the non-WebDAV system in past replication transactions. Thereafter, for each replication transaction, a manifest of changes since the last replication transaction is transmitted from the WebDAV system to the intermediate server. The manifest includes information in accordance with the WebDAV protocol, i.e. without notice of "add" events. For each "change" event in the manifest, the object reported as changed is compared to the list of objects in the sync state table from the previous transaction. If the object does not exist in the table then the intermediate server changes the object's type from a "change" event to an "add" event and the object is added to the sync state table. When the manifest has been fully processed, the sync state table is persisted for future use.

19 Claims, 5 Drawing Sheets

| MANIFEST | | |
|---|---|---|
| ACTION | REPL-UID | OBJECT DATA |
| CHANGE | XXXX123 | {NEW DATE};{OTHER DATA} |
| DELETE | XXXX010 | {NULL} |
| CHANGE | XXXX747 | {READ FLAG}; {OTHER DATA} |
| CHANGE | XXXX362 | {MESSAGE PROPERTIES} |
| DELETE | XXXXXXX | {NULL} |

| SYNCH STATE TABLE | |
|---|---|
| INDEX | REPL-UID |
| XXX | XXXX123 |
| XXX | XXXX010 |
| XXX | XXXX979 |
| XXX | XXXX747 |
| XXX | XXXX425 |
| XXX | XXXX206 |
| XXX | XXXX256 |
| XXX | XXXX205 |
| XXX | XXXX360 |

| NEW MANIFEST | | |
|---|---|---|
| ACTION | REPL-UID | OBJECT DATA |
| CHANGE | XXXX123 | {NEW DATE};{OTHER DATA} |
| DELETE | XXXX010 | {NULL} |
| CHANGE | XXXX747 | {READ FLAG}; {OTHER DATA} |
| ADD | XXXX362 | {MESSAGE PROPERTIES} |
| DELETE | XXXXXXX | {NULL} |

SYSTEM AND METHOD FOR TRANSLATING SYNCHRONIZATION INFORMATION BETWEEN TWO NETWORKS BASED ON DIFFERENT SYNCHRONIZATION PROTOCOLS

TECHNICAL FIELD

The present invention relates to mobile communications, and, more specifically, to systems for synchronizing data between mobile and conventional computing systems.

BACKGROUND OF THE INVENTION

With the growing use of mobile electronics devices, many systems are being developed to support replicating information contained on an information server, such as an e-mail server or the like, with those mobile devices. In response to a search command, some replication protocols provide that data that has changed state since the previous replication are identified by "change" and "delete" tags, as appropriate. If the data has been deleted since the previous replication, that data is identified with a "delete" tag. For data that has either been added or modified since the previous replication, that data is identified with a "change" tag.

It is important to note that some replication protocols do not provide for an "add" event to indicate that a new object was added. One example of such a protocol is Exchange WebDAV-based replication. However, systems based on other synchronization protocols do support notifications for "add" events in addition to "change" and "delete" events. Such a system will not understand a message which indicates that a "change" should be made to an object that did not already exist. Thus, receiving such a command would result in undesirable behavior in a system that does not understand the "add" event. It would be advantageous to take advantage of "add" notifications even when replicating (also known as "synchronizing") with systems that do not provided add event notification, such as the DAV protocol.

SUMMARY OF THE INVENTION

Briefly described, the present invention implements a mechanism to compute whether an event identified as a "change" event by a synchronization protocol that does not provide "add" event notification is actually an "add" event for the purpose of a protocol that implements an "add" event as different from a "change" event. For example, two systems may interact, one that communicates using a protocol that does not use "adds" (the "Server") and another that communicates using a protocol with "add" event support (the "client system"). On a first replication transaction between the two systems, a sync state table is created on an intermediate server or a server that facilitates communication between the information system and the client system. Although described in the context of a separate Server and intermediate server, it will be appreciated that a single computing system may be used to implement the same functionality The sync state table is linked to the client system for future replication transactions. The sync state table maintains a list of objects that have been sent to the client system in past replication transactions. Thereafter, each time the client system performs a replication transaction with the Server, a manifest of changes since the last replication transaction is transmitted from the Server to the intermediate server. The manifest includes information about the changes or deletions, but without notice of "add" events. For each "change" event in the manifest, the object reported as changed is compared to the list of objects in the sync state table from the previous transaction. If the object does not exist in the table then the intermediate server changes the object's notification from a "change" tag to an "add" tag and the object is added to the sync state table. When the manifest has been fully processed, the sync state table is persisted for future use.

The present invention provides a system, which allows the maintenance of knowledge of objects, which reside on the client system. That information may then be used to determine whether an event identified as a "change" event is actually an "add" event. Advantageously, the intermediate server may translate the information from the manifest to a format that takes advantage of the additional add event notification capability.

DETAILED DESCRIPTION OF THE PREFERRED EMBODIMENT

The present invention may be implemented in one or more components operating within a distributed or wireless computing network. Those components may include software programs or applications operating on computing systems of various configurations. Two general types of computing systems are being used to implement the embodiments of the invention described here. Those two general types are illustrated in FIG. 1 and FIG. 2 and described below, followed by a detailed discussion of one illustrative implementation of the invention, illustrated in FIGS. 3–6, based on these two types of computer systems.

Illustrative Operating Environment

Figure 1:
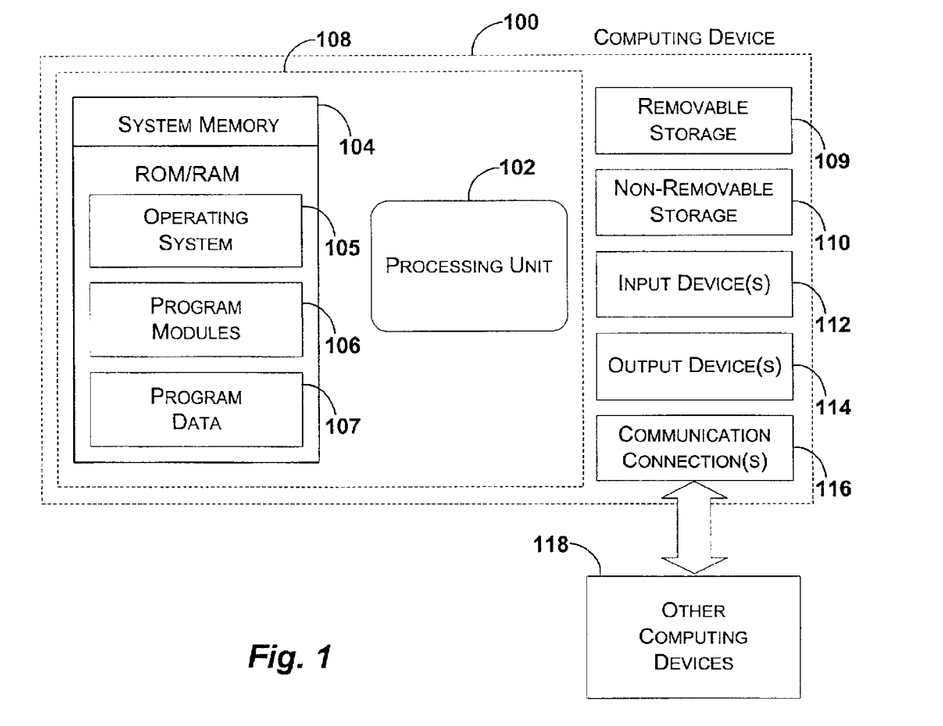
FIG. 1 is a functional block diagram illustrating functional components of a conventional computing device that may be adapted to implement one embodiment of the present invention.
Figure 2:
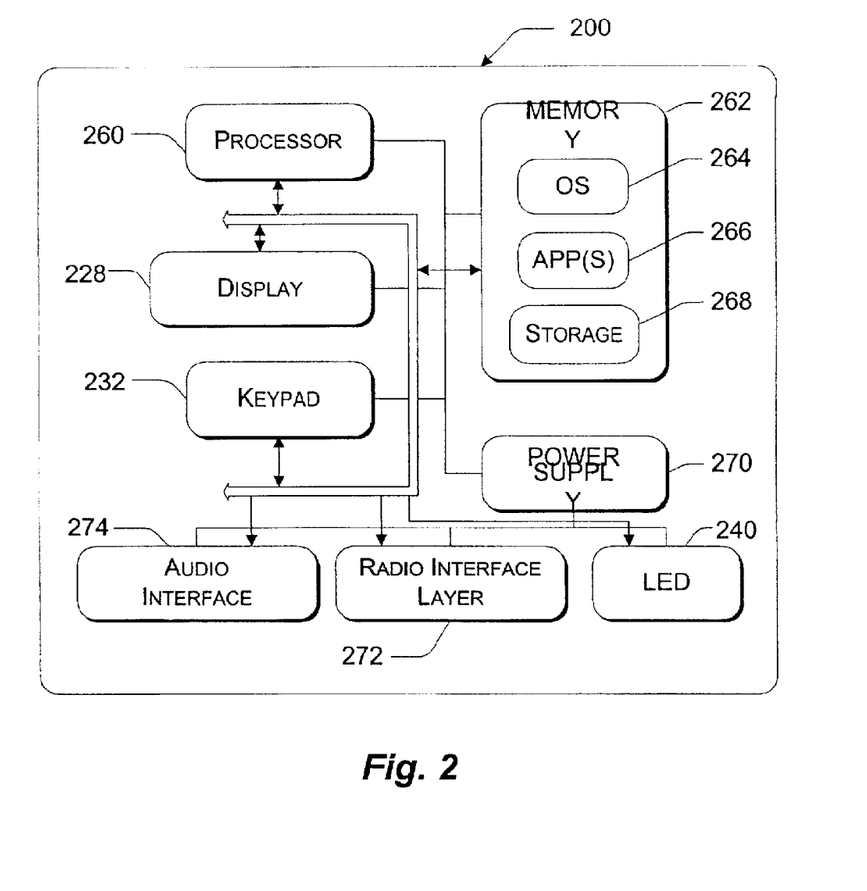
FIG. 2 is a functional block diagram illustrating functional components of a mobile computing device that may be adapted to implement one embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communications connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Mobile Computing Device

FIG. 2 is a functional block diagram illustrating functional components of a mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Synchronization System

Figure 3:
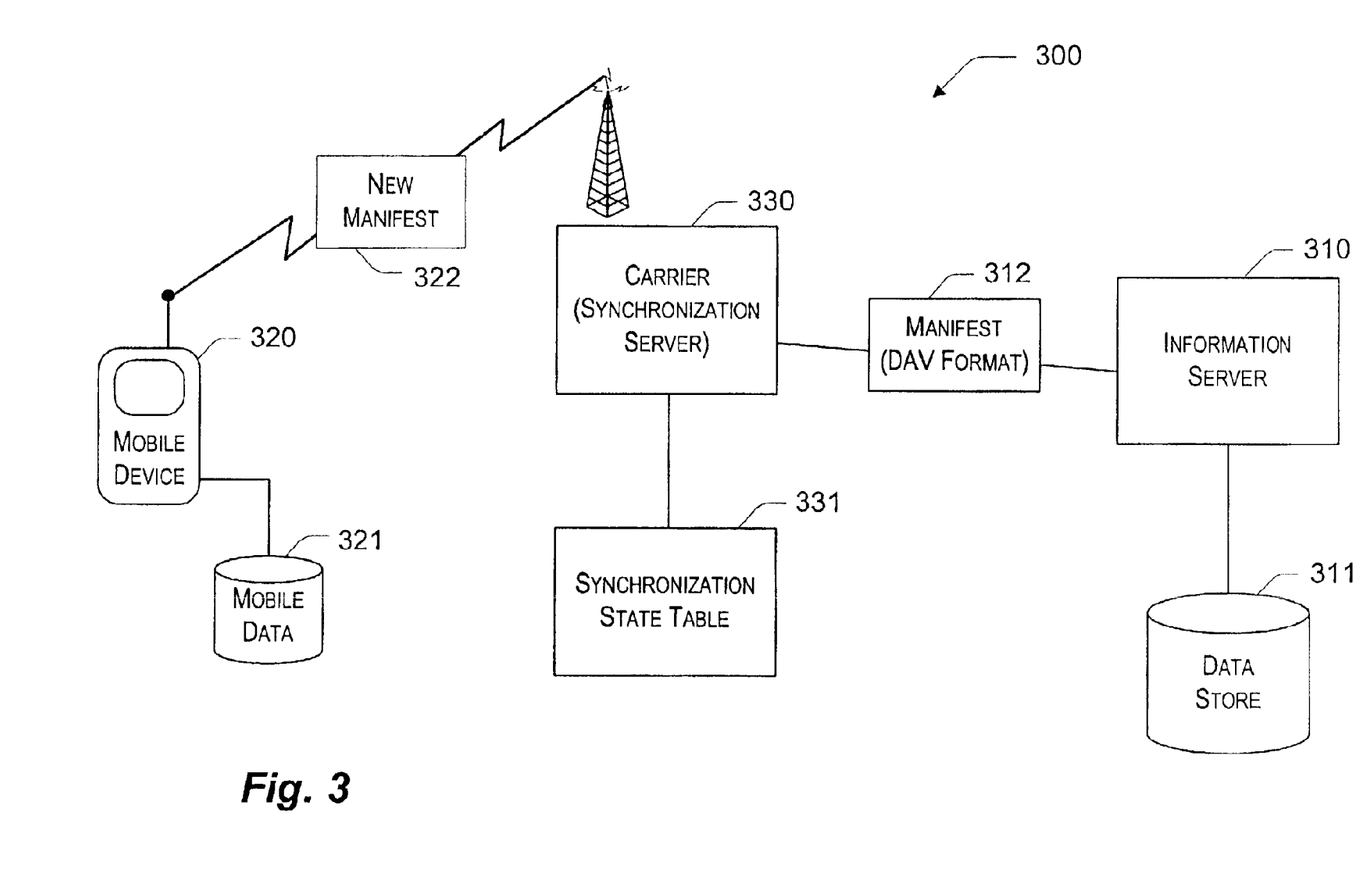
FIG. 3 is a functional block diagram generally illustrating one system, implementing the present invention, for maintaining synchronization between a fixed data store and a mobile device.

FIG. 3 is a functional block diagram generally illustrating one system, implementing the present invention, for maintaining synchronization between a fixed data store, such as an information server 310, and a mobile device 320. In this implementation, the information server 310 is a computing device such as the one described above in conjunction with FIG. 1, and the mobile device is a mobile computing device such as the one described above in conjunction with FIG. 2.

The information server 310 includes a data store 311 on which resides information that is used by a user of the mobile device 320. For example, the information server 310 could be an e-mail server that houses e-mail messages, contact information, appointment information, and the like for the user. Another copy of the information also resides on the mobile device 320 within a mobile data store 321. The set of similar information that resides in a specific folder on both the information server 310 and the mobile device 320 is referred to as a "collection." By storing the collection on both the information server 310 and the mobile device 320, the user always has access to the collection, such as via a conventional computing system connected to the information server 310 or directly through the mobile device 320. However, to ensure that changes to the collection that occur on the mobile device 320 are reflected in the information server 310 and vice versa, the two computing systems are synchronized.

Synchronization between the two devices may be performed via a synchronization server 330 that is in communication with both the information server 310 and the mobile device 320. It will be appreciated that the synchronization server 330 may be collocated with the information server 310, such as within a corporation or other business enterprises. Alternatively, the synchronization server 330 may be part of a mobile communications service provider that is in wireless communication with the mobile device 320 and in communication with the information server 310. In still another alternative, the synchronization server 330 may be part of the mobile device itself.

The synchronization server 330 is coupled to the information server 310 over a local or wide area network in the conventional manner. The information server 310 provides synchronization (or replication) capability using a protocol that does not make use of "add" event notification, such as the Document Authoring and Versioning (DAV) standard protocol (sometimes referred to as WebDAV). Although reference is made to the use of the DAV or WebDAV protocol, that is only one example of a protocol that does not include "add" event notification, and the present invention is equally applicable to any similar protocol.

In accordance with that protocol, other applications may interact with the data store 311 to view, modify, and retrieve items within the collection. As is well known in the art, a synchronization operation basically occurs as follows. A client, such as the synchronization server 330, issues to the information server 310 a sync command (e.g., a PROPFIND or SEARCH command). The sync command includes a notification of the items within the collection that the client already has and their state so that the information server 310 does not retransmit the same information.

The information server 310 responds to the sync command by identifying any items in the collection on the data store 311 that the client does not already have the current version of together with additional information about how that information is different (i.e., how the information should be modified to reflect the current version). The client then uploads to the information server 310 any items that the client knows has changed since the last synchronization, and downloads any new items from the data store 311.

Figure 4:
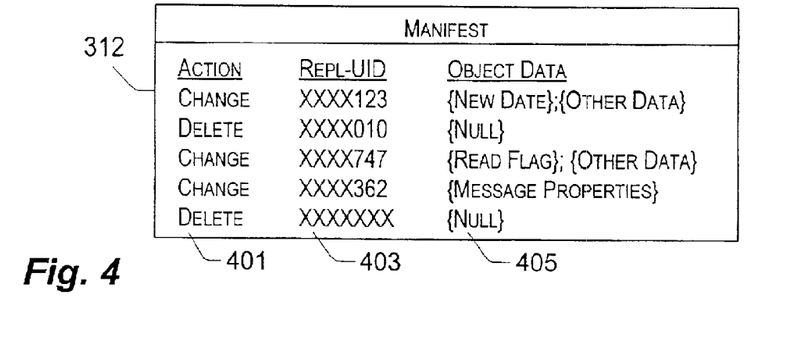
FIG. 4 is a functional block diagram generally illustrating the salient portions of a sample manifest used in conjunction with the present invention.

More specifically, the information server 310 responds to the sync command by returning a "manifest" 312 that includes a list of changes in the collection on the data store 311. The manifest 312 may also include information identifying the changes to make to the collection on the mobile device 320 to synchronize the information. One example of the structure of a manifest is illustrated in FIG. 4 and described below. One important feature of the manifest 312 is that, in accordance with the particular protocol being used between the information server 310 and the synchronization server 330, only "change" and "delete" related instructions are provided. In other words, if an item has been added to the collection on the information server 310, a "change" instruction would be included in the manifest 312 identifying the new item.

In contrast, the synchronization protocol used between the mobile device 320 and the synchronization server 330 makes use of an "add" instruction, and if issued a "change" instruction for an item, which does not yet exist on the mobile device 320, the synchronization transaction may fail, at least for the specific item. For this reason, the synchronization server 330 of this implementation employs mechanisms for determining when a "change" instruction is in fact an "add" instruction, and for replacing those "change" instructions with the appropriate "add" instructions.

The synchronization server 330 maintains, among other things, a sync state table 331. Information about the current version of the items in the collection on the mobile device 320 is stored in the sync state table 331. The stored information may be as simple as only a unique identifier for each item in the collection on the mobile device 320 (e.g., a replication unique identifier or "Repl-UID"). The sync state table 331 is associated with the mobile device such that each synchronization transaction causes the synchronization server 330 to update the sync state table 331.

The sync state table 331 identifies which items already exist in the collection on the mobile device 320. Thus, when the manifest 312 comes in, the information in the manifest 312 is compared to the sync state table 331 to identify any items which are marked "change" in the manifest 312 but which do not yet exist on the mobile device 320. Put another way, the synchronization manager 330 determines whether any items marked with a "change" instruction in the manifest 312 are identified in the sync state table 331. If not, then the instruction marked as "change" in the manifest is in actuality an instruction to add the item. Thus, the synchronization server 330 can change those instructions to the proper "add" instruction, and create a new manifest 322. The new manifest 322 includes the substantive information from the manifest 312, except that "change" instructions that are actually "adds" are replace with the appropriate instructions. The new manifest 322 is then transmitted to the mobile device 320 to continue the synchronization transaction.

FIG. 4 is a functional block diagram generally illustrating the salient portions of a sample manifest 312 used in conjunction with the present invention. In the sample manifest 312, each row is associated with a particular item or message, such as a single e-mail message or contact. Each entry includes three columns of information: an action column 401, an ID column 403, and an object data column 405. The ID column 403 identifies the particular item to which the record in the manifest 312 pertains. For example, an item in the collection could be an e-mail message identified by the Repl-UID "XXXX123." The action column 401 identifies the particular action to perform on the property. The object data column 405 includes the particular properties of the corresponding item.

Figure 5:
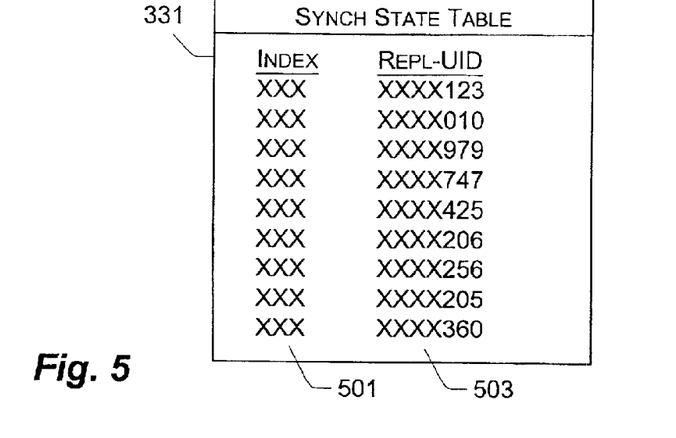
FIG. 5 is a functional block diagram generally illustrating the salient portions of a sample sync state table used in conjunction with the present invention.

FIG. 5 is a functional block diagram generally illustrating the salient portions of a sample sync state table 331 used in conjunction with the present invention. It includes at least one column, an ID column 503, that contains unique identifiers associated with each item in the collection stored on the mobile device 320. The sync state table 331 may be created by the synchronization server 330 during a first synchronization transaction of the mobile device 320, or, alternatively, may be provided by the mobile device 320 to the synchronization server 330 at any other time.

Figure 6:
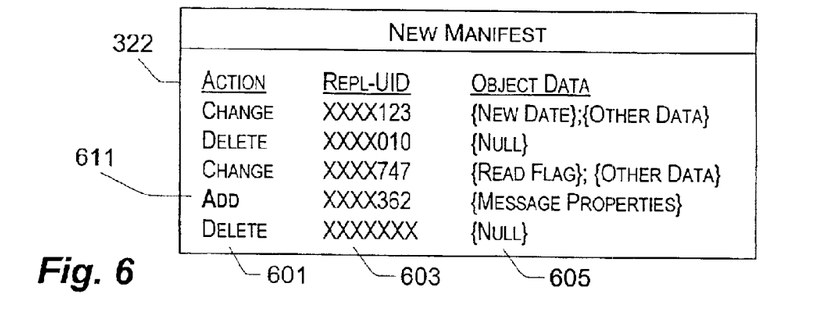
FIG. 6 is a functional block diagram generally illustrating the salient portions of a sample new manifest created from the manifest illustrated in FIG. 5 and the sync state table illustrated in FIG. 5, in accordance with the present invention.

FIG. 6 is a functional block diagram generally illustrating the salient portions of a sample new manifest 322 used in conjunction with the present invention. The new manifest 322 closely resembles the manifest 312 and includes the same columns, action column 601, ID column 603, and object data column 605. However, because the new manifest 322 is compatible with a different type of synchronization protocol, it may include "add" instructions 611 in the action column 601, unlike the manifest 312.

It should be noted that although the conceptual image of the new manifest 322 closely resembles the conceptual image of the manifest 312, those skilled in the art will appreciate that the programmatic differences may be extensive. For instance, one manifest may be in an eXtensible Markup Language (XML) format having a first schema, and the new manifest may be in an XML format having a completely different schema, although the information contained is similar.

Illustrative Synchronization Method

Figure 7:
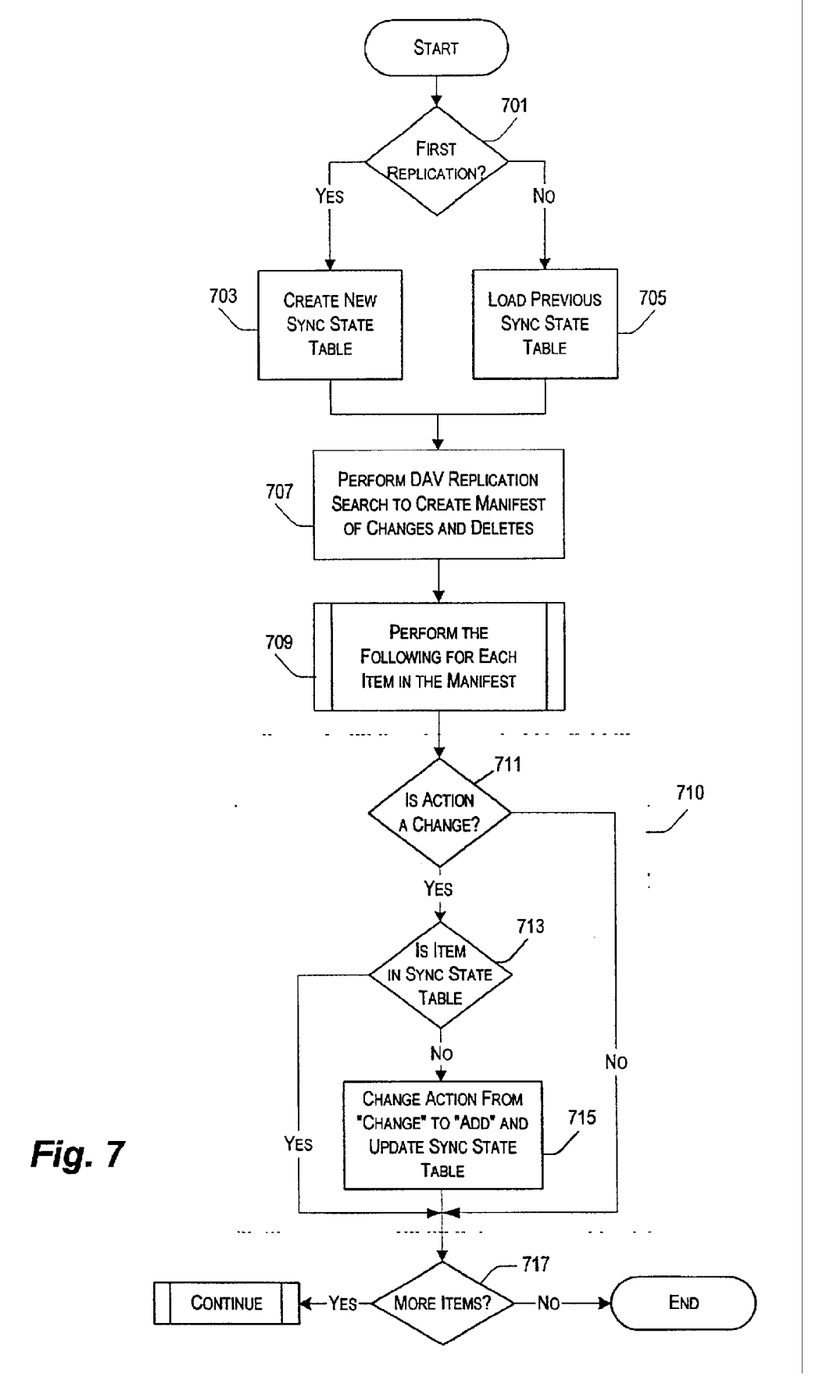
FIG. 7 is a logical flow diagram generally illustrating a method for translating synchronization information between a mobile device and a server in accordance with the present invention.

FIG. 7 is a logical flow diagram generally illustrating a method 700 for translating synchronization information between a mobile device and a server in accordance with the present invention. The method 700 begins with the initiation of a synchronization transaction. At decision block 701, the method determines whether the current synchronization transaction (also called a "replication") is the first synchronization of the mobile device 320 with the information server 310.

If the current synchronization transaction is the first one, at block 703, the synchronization server 330 creates a new, empty sync state table, such as the one described above in conjunction with FIG. 5 and links the new sync state table with the mobile device 320. The synchronization server 330 may initially populate the sync state table with any objects identified by the mobile device 320 during the current synchronization transaction. If the current synchronization transaction is not the first, at block 705, the synchronization server loads a previously-stored sync state table associated with the collection on the mobile device 320. The sync state table maintains a list of objects that have been sent to the mobile device 320 in past synchronization transactions.

With the sync state table loaded or created, at block 707, the synchronization server 330 performs a replication search to create a manifest of change and delete events. As described above, the sync server 330 issues a sync command to the information server 310, which returns the manifest identifying each item that has changed since the last replication.

At block 709, the method 700 enters an iterative loop 710 including decision block 711, decision block 713, and block 715. The loop 710 is repeated for each item in the manifest received at block 707. The loop 710 determines whether each item is identified as a "change" (at decision block 711), and if not, proceeds to the next item in the manifest. However, for each "change" item in the manifest, a determination is made (at decision block 713) whether the item marked as "change" exists within the sync state table. If so, then the loop proceeds to the next item in the manifest. But if the item marked as "change" does not exist in the sync state table, then its action type is changed from "change" to "add" (at block 715) and the item is added to the sync state table. At decision block 717, a determination is made whether there are more items to process, and if so, the loop continues. Otherwise, the process ends. After all entries in the manifest have been processed, the sync state table is persisted for use in the future.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer implemented method for replicating information, comprising:

receiving a first manifest of modifications to a data store, wherein the first manifest is compatible with a synchronization protocol that does not support add events;

comparing the first manifest of modifications to a list of objects within a mobile data store;

altering the first manifest to reflect that a particular modification is associated with an add event for an object not on the list of objects within the mobile data store when the particular modification identified in the first manifest is interpreted as being associated with a change event for the object not on the list of objects; and creating a second manifest of modifications from the altered first manifest, wherein the second manifest is compatible with a synchronization protocol that supports add event.

2. The method of claim 1, further comprising passing the second manifest to a mobile device on which resides the mobile data store.

3. The method of claim 2, wherein the second manifest includes modifications that describe add events, change events, and delete events.

4. The method of claim 3, wherein the add events, change events, and delete events describe actions to be performed on objects that reside in the mobile data store.

5. The method of claim 1, wherein the first manifest does not contain a modification that describes an add event, and wherein the second manifest contains at least one modification that describes an add event.

6. The method of claim 1, wherein the first manifest is created in accordance with a Document Authoring and Versioning (DAV) protocol.

7. The method of claim 1, wherein the second manifest is not consistent with a DAV protocol.

8. The method of claim 1, wherein the first manifest is created in response to a request to synchronize the data store and the mobile data store.

9. The method of claim 8, wherein the request to synchronize comprises a search request for objects on the data store that have changed since a prior synchronization transaction between the data store and the mobile data store.

10. The method of claim 8, wherein the request to synchronize comprises a search request for objects on the data store that have been deleted since a prior synchronization transaction between the data store and the mobile data store.

11. A computer-readable medium having computer-executable instructions for synchronizing data between a first data store and a second data store, comprising:

issuing a sync request to the first data store, the first data store containing a collection of data objects;

receiving from the first data store a first manifest that includes records describing objects that have changed state on the first data store since a prior synchronization transaction between the first data store and the second data store, wherein each record identifies an action associated with the corresponding object, wherein the first manifest is compatible with a synchronization protocol that does not support add events, and wherein the action is either a change event or a delete event;

comparing the first manifest to a sync state table identifying objects that exist on the second data store;

altering the action associated with an object to an add event when the object is not in the sync state table arid when a record associated with the object in the first manifest is interpreted as being associated with a change event; and creating a second manifest that includes the altered record, wherein the second manifest is compatible with a synchronization protocol that supports add events.

12. The computer-readable medium of claim 11, further comprising including in the sync state table the object that was not in the sync state table.

13. The computer-readable medium of claim 11, further comprising passing the second manifest to the second data store.

14. The computer-readable medium of claim 13, further comprising passing the object that was not in the sync state table to the second data store.

15. The computer-readable medium of claim 11, wherein the first data store and the second data store each contain copies of the collection of data objects.

16. The computer-readable medium of claim 15, wherein the data objects comprise e-mail messages.

17. The computer-readable medium of claim 15, wherein the data objects comprise contact information objects.

18. A computer-readable medium having computer-executable instructions for synchronizing data between a first data store and a second data store, comprising:

receiving from the second data store a request to synchronize data objects on the second data store with data objects on the first data store;

determining whether a sync state table exists that is associated with the second data store, wherein the sync state table identifies the data objects on the second data store if the sync state table does not exist, creating the sync state table to identify the data objects on the second data store;

issuing a search request to the first data store;

in response to the search request, receiving a first manifest of data objects on the first data store, wherein the first manifest is compatible with a synchronization protocol that does not support add events;

including in the sync state table any objects identified in the first manifest that are associated with a change event but are not included in the data objects of the first data store; and creating a second manifest of data objects by altering the first manifest, wherein the second manifest is compatible with a synchronization protocol that supports add events, and wherein the second manifest associates an add event with each object identified in the first manifest but not identified in the sync state table.

19. The computer-readable medium claim 18, further comprising passing the second manifest to the second data store.

* * * * *